UNITED STATES PATENT OFFICE.

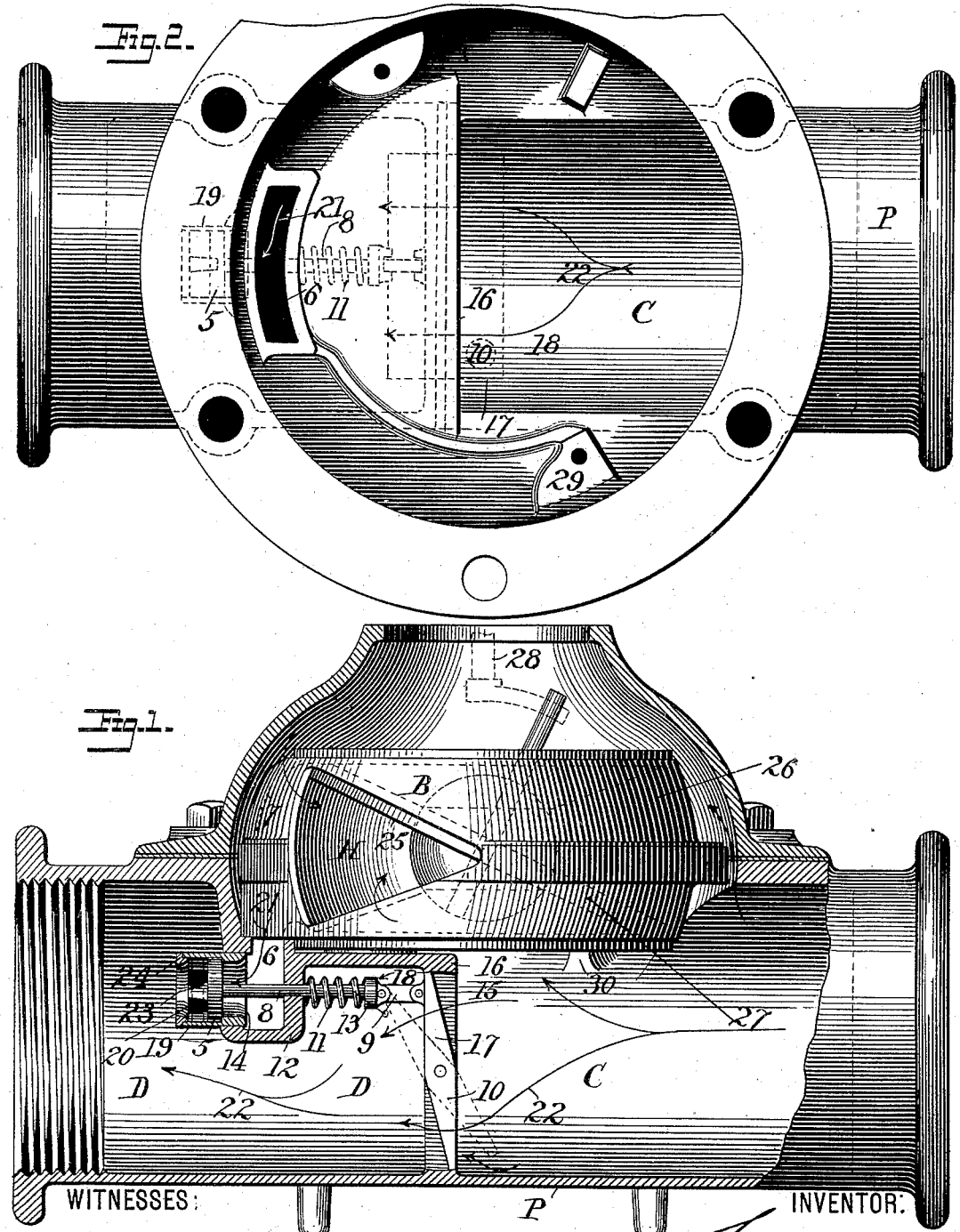

JOHN THOMSON, OF BROOKLYN, ASSIGNOR TO THE THOMSON METER COMPANY, OF NEW YORK, N. Y.

POSITIVE PROPORTIONAL WATER-METER.

SPECIFICATION forming part of Letters Patent No. 476,096, dated May 31, 1892.

Application filed September 8, 1891. Serial No. 405,103. (No model.)

*To all whom it may concern:*

Be it known that I, JOHN THOMSON, a citizen of the United States, residing in Brooklyn, Kings county, State of New York, have invented certain new and useful Improvements in Positive Proportional Water-Meters, of which the following is a specification.

This is an invention in positive proportional water-meters, and the following specification sets forth the method and apparatus for operating the same.

In the drawings, Figure 1 is a vertical center section and elevation, and Fig. 2 is a top plan view, of apparatus adapted to carry out my invention. In Fig. 2 the casing B of Fig. 1 is omitted.

The objects and advantages of the invention will be severally pointed out as the description progresses.

First. The first feature relates to the method of controlling the flow, which consists in causing the measured stream, usually the lesser aliquot part, to alone govern the flow of the entire volume, in which particular the invention differs radically from previous practice, as hitherto either the non-measured stream or both the measured and the non-measured coacting have invariably been employed for the purpose of such control, whence if the meter mechanism failed to act or became partially obstructed the water would either be free to pass without leaving any record or would be improperly registered; but in the present instance the action of the meter mechanism must precede the operation of the valves. Should the mechanism of the measuring device fail to operate and its parts be capable of withstanding the total pressure from the pipe, then no water could pass the meter, a condition exactly opposite to previous inventions in this class. Moreover, as I place a positive type of meter mechanism in the circuit of the measured stream and as the discharge of the whole volume is dependent upon and subsequent to the action of such mechanism then it logically follows that the measurement of the whole volume is positive. It is upon this proposition that I base the title of the invention, marking a new type, as far as I am aware—a positive proportional meter. In carrying this conception into effect it is simply required that some yielding obstruction—as, say, a weighted or floated piston or a spring-flap or puppet-valve, which will be herein designated a "controlling-valve"—be properly interposed in the path of the measured stream, the said controlling-valve to be then connected to an equilibrium-valve adapted to be actuated by the controlling-valve, whereby to govern the discharge of the entire volume. The consequence of this is that any movement of the equilibrium-valve will be directly and solely due to the motion of the controlling-valve, primarily actuated by the measured volume. With the intention of indicating the scope of this method it has purposely been omitted to specify in the foregoing paragraph, as I now do, that the preferable location of both the controlling and of the equilibrium valves are at the discharge end of the device. The reason for this preference is that variations of pressure in chamber C due either to mechanical or hydraulic causes are transmitted to the controlling-valve, which responds thereto at all ordinarily low rates of flow. Thus in the schematic illustration of the drawings the controlling-valve—a simple piston 5—is situated in the path of the outlet-port 6, leading from the discharging-chamber 7 of the casing B, which latter contains the measuring mechanism. The spindle 8, fixedly attached to the controlling-valve, passes back and is connected by a link 9 to the swinging equilibrium-valve 10. The spring 11 acts between the wall 12 and the collar 13 of the spindle to force the valves back to a predetermined position, as the stop-shoulder 14. The pivoted equilibrium-valve 10 is swung in the opening 15 of the partition 16, and when this valve is in the position indicated by the full lines—that is, with the sides 17 and lips 18 within the walls of the opening—the valve and partition together form an intercepting-diaphragm and no water can pass from the inlet-chamber C to the outlet-chamber D, nor can the equilibrium-valve be vibrated or displaced by change of pressure alone between C and D. The controlling-valve is contained within a cylinder 19, having slotted openings 20 in its side, the inner terminations of which, as here shown in the full-line position, are lapped by the controlling-valve. Now to cause the operation of the device as a whole it follows from what has already been submitted that the water must first flow directly from chamber C through the measuring-casing B, causing its mechanism to act before or concurrent with the movement of the controlling-valve, establishing a current, as arrow 21, through the outlet-port of the measuring-casing B prior to the flow past the equilibrium-valve, arrows 22; but as the controlling-valve is forced forward against the thrust of the spring the slots 20 will be opened, affording egress for the water from the casing B into chamber D, while, responding to the impulse of the controlling-valve, the equilibrium-valve will be swung on its axis, affording direct escape for the volume of water from chamber C also into chamber D. It is to be understood that the area afforded by the respective valves is uniformly proportionate each to the other in any position in which they may be situated, provided that water is passing both valves at one and the same time, when the flow may be said to be differential. This result is to be obtained by a proper proportional movement and opening of the valves.

Second. The second feature is in the "setting" of the valves and the relation of the measuring mechanism to the entire volume of discharge. It will be evident without extra illustration over that afforded by the drawings that either the controlling-valve or the equilibrium-valve may be so disposed that one will afford egress in advance of the other. The consequence of this would be that if the equilibrium-valve opens in advance water will escape from C to D without passing through the measuring-casing, and there would then be no indication on the register until the rate of flow and excess of pressure became sufficient to start the meter mechanism and operate the controlling-valve, while if the controlling-valve opens in advance of the other the register of the meter will be caused to over-indicate to the extent of the difference of its relation to the entire quantity, as the entire volume will then pass through the measuring-chamber; but another condition may be obtained in which the valves would be arranged to act disproportionately at low flows, the controlling-valve then opening more rapidly than the equilibrium-valve. This feature is utilized to force the meter to indicate disproportionately to cause over-registration at low flows, a result exactly opposite from that of previous practice, in which the indication either bears no proportional relation, the entire quantity passing the measuring-chamber, or makes no record at all at low rates of discharge. To fully appreciate the importance of this feature I would say that I contemplate a measuring mechanism of but one fixed size and maximum capacity to be applied to all of the different sizes of pipes, whence it follows that the several sizes of meters in regular service will require to be adapted only in the relation of their valves and registers. To illustrate, the drawings show to full scale a two-inch meter—maximum capacity, say, twelve hundred cubic feet an hour. The measuring mechanism comprised in the casing B is that of a one-half-inch size—maximum capacity, say, one hundred and twenty feet an hour. Hence $\frac{1,200}{120}=10$ and yields a proportional relation $:10::1$. In other words, for one unit actually passed by the measuring mechanism the register must indicate ten. In a one-inch meter, upon the same basis of computation, the relation would be about $:4::1$; in a four-inch meter $:40::1$. At the low flows the limitation of operative capacity is entirely in the sensibility of the measuring mechanism. Let it be assumed, which is fair average practice, that the one-half-inch measuring mechanism will record with practical accuracy down to a flow of one cubic foot an hour. Then the respective limits of sensibility of the sizes named would be, for the one-inch, four multiplied by one equals four cubic feet an hour, while for the two-inch and four-inch sizes, respectively, it would be ten and forty cubic feet an hour. It is at rates of flow less than the minimum limit of proper proportional operation that I principally apply the method of over-registration, the aim and object of which is to be able by decreasing the proportional rate, and thus increasing the limit of sensibility, to utilize the measuring mechanism of any capacity of meter as a leak-detector. This is a feature which has been desired by many water-works companies upon the ground that small leaks in large pipes are disregarded by water-takers, because large meters usually do not record them in any measure either great or small.

Third. The third feature relates to the limitation of the valve movement. It has recently been experimentally demonstrated by a most able hydraulician that if a perforated diaphragm or its equivalent be placed in a pipe the effective area thereof may thereby be reduced forty per cent., fifty per cent., or even sixty per cent. or more and yet not materially affect the volume of discharge in a line of considerable length. This means that the friction of a point, so to speak, in the path of a moving fluid is insignificant as compared to the obstruction of a confining-casing of sensible length. I have sought to utilize this principle in the present invention as follows: It will be seen that the controlling-valve may not be forced beyond the position indicated in the dotted lines 23, as it there impinges against the outer stop-collar 24, and I prefer to so set the outer stop-collar in conjunction with the tension of the spring or other retarding means that when the valves are carried to the positions indicated in the dotted lines the total effective area afforded by the valves will be considerably less than the area of the pipe, whereby to produce a throttling action and a sufficient difference of pressure between ports H and 6 to operate the mechanism properly thereafter at all higher rates of flow. This difference of pressure may obviously be brought up to any desired extent. Being thus limited, the range of movement required of the valves is very slight, as at the more rapid flow the valves may be at rest, the meter mechanism being operated by the difference of pressure due to the throttling of the valves. This differs from previous practice in that the valves determine the extent of the throttling, and, furthermore, that the valves do not change their ratio at every rate of flow, but act from a minimum rate up to a predetermined fixed position to afford the area of discharge less than that of the supply-pipe.

Fourth. The fourth feature refers to the disposal of the casing and to the measuring mechanism. It is usual in previous practice in this class to find the friction of the measuring mechanism regarded as of minor importance, in evident dispute of the fact that any change of the frictional coefficient is multiplied by the proportional relation. Consequently, while the actual error may be of no practical value, the recorded error might be of such magnitude as to render the system worthless.

I define the foregoing term "friction of the measuring mechanism" as being comprised in three distinct elements: first, the simple friction of moving parts as acting freely in space, ordinarily of but slight importance; second, the hydraulic friction of simple flow, but of considerably greater value than the first, and, third, the hydraulic and mechanical friction due to intercepted currents, the dynamic condition of operation greater than all other causes combined. The measuring mechanism here shown is a disk action of the character illustrated in my patent, No. 427,485, dated May 6, 1890. With this measuring mechanism this is the disk 25, contained within the internal casings 26 27, transmitting motion to a suitable register, as by the shaft 28, having its single outlet-port H of large capacity, with free water-ways surrounding the casing, all supported on the lugs or seats 29 30 of the main external casing P. The pressure within the receiving-chamber C and at the port H are at all times practically equal. Moreover, as the velocity through the disk-casing is as much lower than that past the controlling-valve as the velocity in C is lower than that past the equilibrium-valve, we might therefore assume that the dynamic relation between C and H will be practically constant, which assumption I have fully demonstrated in actual practice. The effort in this particular has been to obtain a delivery of the influent volume with the greatest area and least velocity and retardation into the ingress-port H of the measuring-chamber, the reasons for which are that the lower the initial resistance and the greater the volume of supply the more uniform will be the operation, the more readily may any mechanical fluctuations be controlled, and the more intense and effective will be the difference of pressure due to the throttling of the valves. In other words, it is as pounds of pressure intensified between two contiguous points or uniformly distributed over a lineal line of sensible extent. The former is effective for useful work, the latter would be absorbed by friction. By this arrangement and disposal I eliminate two disturbing elements of previous practice—namely, an inlet to the measuring-casing and a plurality of ports leading from the casing into the measuring-chamber. Thus there is here shown but one receiving or inlet chamber C, within which, as a part thereof, is the open port H of the measuring mechanism.

In so far as relates to the apparatus herein shown I do not limit myself to its precise construction and disposal, as I deem the disclosure sufficient for the present purpose without burdening the drawings with modified designs such as would naturally come to the mind of any expert in the art to whom these presents may come.

What I claim is—

1. The method, substantially as hereinbefore set forth, of controlling the operation of proportional water-meters, which consists in causing the measured volume to directly control the discharge of the measured and unmeasured volumes.

2. The method, substantially as hereinbefore set forth, of controlling the operation of proportional water-meters, which consists in causing the discharge of the measured volume to directly and positively control the discharge of the unmeasured volume.

3. The method, substantially as hereinbefore set forth, of positively controlling the operation of proportional water-meters, which consists in causing the measured volume to act directly upon a yielding controlling device and directly controlling the equilibrium device governing the flow of the unmeasured volume by the said yielding controlling device.

4. The method, substantially as herein set forth, of positively controlling the operation of proportional water-meters, which consists in causing the measured volume to act upon a controlling-valve having a yielding resistance and a directly and positively operated equilibrium-valve adapted to govern the flow of the unmeasured volume by said controlling-valve.

5. The within-described apparatus constituting a positive proportional water-meter, comprising the main external casing having mounted within its chamber a positive measuring mechanism, the controlling-valve having a yielding resistance, and an equilibrium-valve directly connected to the controlling-valve to act therewith, the arrangement and construction being such that the movements of said valves are caused by the action of the discharge from the measuring mechanism and the yielding resistance, substantially as set forth.

6. In a positive proportional water-meter, the combination of the controlling-valve having a yielding resistance, the equilibrium-valve directly connected to the controlling-valve, ports for the aforesaid valves, the valves being arranged to open and close the ports in a differental ratio, the main casing having inlet and outlet chambers, and a positive measuring mechanism connected to the inlet-chamber and discharging through the controlling-valve to the outlet-chamber, the arrangement and construction being such that the volume which passes through the said positive measuring mechanism causes the operation of the controlling-valve and the latter directly operates the equilibrium-valve, substantially as specified.

7. In a positive proportional water-meter, the combination, with the main casing and the measuring mechanism, of the controlling-valve, the equilibrium-valve, direct connections between the controlling-valve and the equilibrium-valve, the spring, and the valve-ports, substantially as specified.

In testimony whereof I have signed my name to this specification in the presence of two subscribing witnesses.

JOHN THOMSON.

Witnesses:
  F. A. LORECRAFT,
  JOS. W. KAY.